(12) United States Patent
Dumas

(10) Patent No.: US 8,035,306 B2
(45) Date of Patent: Oct. 11, 2011

(54) DEVICE FOR SETTING LUMINOSITY OF LIGHT-EMITTING DIODES

(76) Inventor: Pierre-Alain Dumas, Paris (FR)

( * ) Notice: Subject to any disclaimer, the term of this patent is extended or adjusted under 35 U.S.C. 154(b) by 478 days.

(21) Appl. No.: 11/722,068

(22) PCT Filed: Dec. 20, 2005

(86) PCT No.: PCT/FR2005/003201
§ 371 (c)(1),
(2), (4) Date: Sep. 12, 2009

(87) PCT Pub. No.: WO2006/067329
PCT Pub. Date: Jun. 29, 2006

(65) Prior Publication Data
US 2010/0079084 A1 Apr. 1, 2010

(30) Foreign Application Priority Data
Dec. 20, 2004 (FR) ..................................... 04 13549

(51) Int. Cl.
*H05B 37/02* (2006.01)
(52) U.S. Cl. ....................................... 315/192; 315/307
(58) Field of Classification Search .................. 315/291, 315/294, 297, 307, 312, 360, 362
See application file for complete search history.

(56) References Cited

U.S. PATENT DOCUMENTS

| | | | | |
|---|---|---|---|---|
| 4,298,869 A | * | 11/1981 | Okuno | ............................. 345/82 |
| 5,629,570 A | * | 5/1997 | Weigert | ........................ 307/118 |
| 5,661,374 A | | 8/1997 | Cassidy et al. | |
| 6,806,659 B1 | | 10/2004 | Mueller et al. | |
| 7,352,138 B2 | * | 4/2008 | Lys et al. | ....................... 315/291 |
| 7,561,271 B2 | * | 7/2009 | Davis | ............................. 356/402 |
| 2003/0006717 A1 | | 1/2003 | Roller et al. | |
| 2008/0012506 A1 | * | 1/2008 | Mueller et al. | ................ 315/294 |
| 2011/0089867 A1 | * | 4/2011 | Roberts et al. | ................ 315/307 |

OTHER PUBLICATIONS

International Search Report, Apr. 5, 2006, from International Phase of the instant application.
English Translation of the Written Opinion of the International Search Authority, Aug. 13, 2007, from International Phase of the instant application.
English Translation of International Preliminary Report on Patentability Chapter 1, Aug. 14, 2007, from International Phase of the instant application.
LM317 Technical Specifications, Fairchild Semiconductor 2001.
LM117/217, LM317 Technical Specifications, STMicroelectronics 2004.

* cited by examiner

*Primary Examiner* — Don Le
(74) *Attorney, Agent, or Firm* — Jackson Patent Law Office

(57) ABSTRACT

The invention concerns a circuit for setting all types of LED'S (7), mounted in series of five, their particular arrangements in series of five, powered by a direct voltage higher than 14 volts, using an LM 317 T regulator (1) and a potentiometer of 4.7 kOhms (8) providing them with a variable luminance. Complementary setting resistors (R1, R2, R3), are arranged in series or in parallel, on the trigger or at the regulator output, so as to obtain a setting stroke starting form the outset of the illumination that is around 7.5 volts, up to its maximum performance around 12.5 volts. The invention is designed to replace all the applications where fixed LED'S are used.

10 Claims, 4 Drawing Sheets

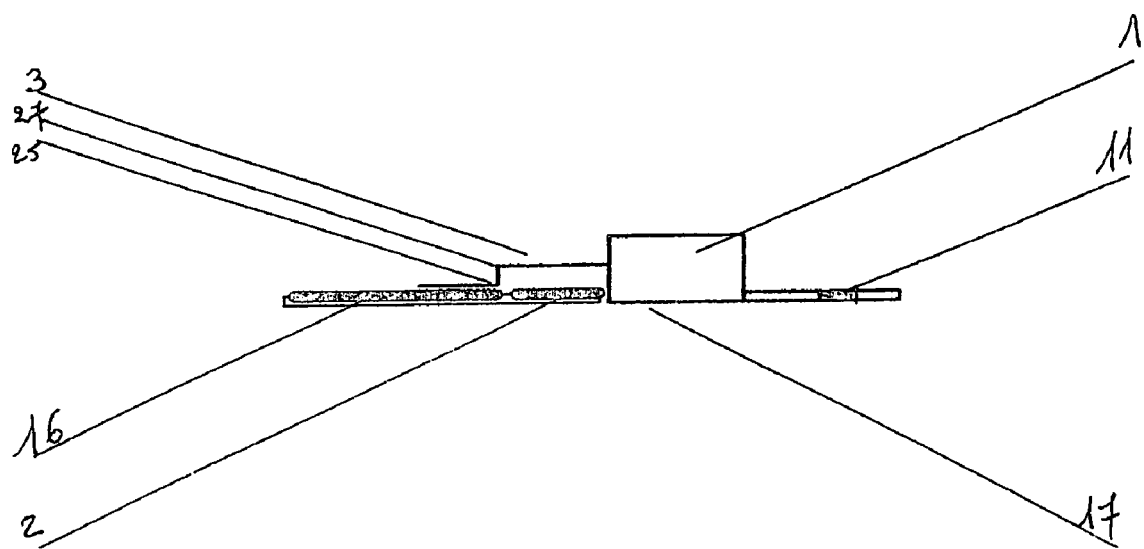
FIG. N°1

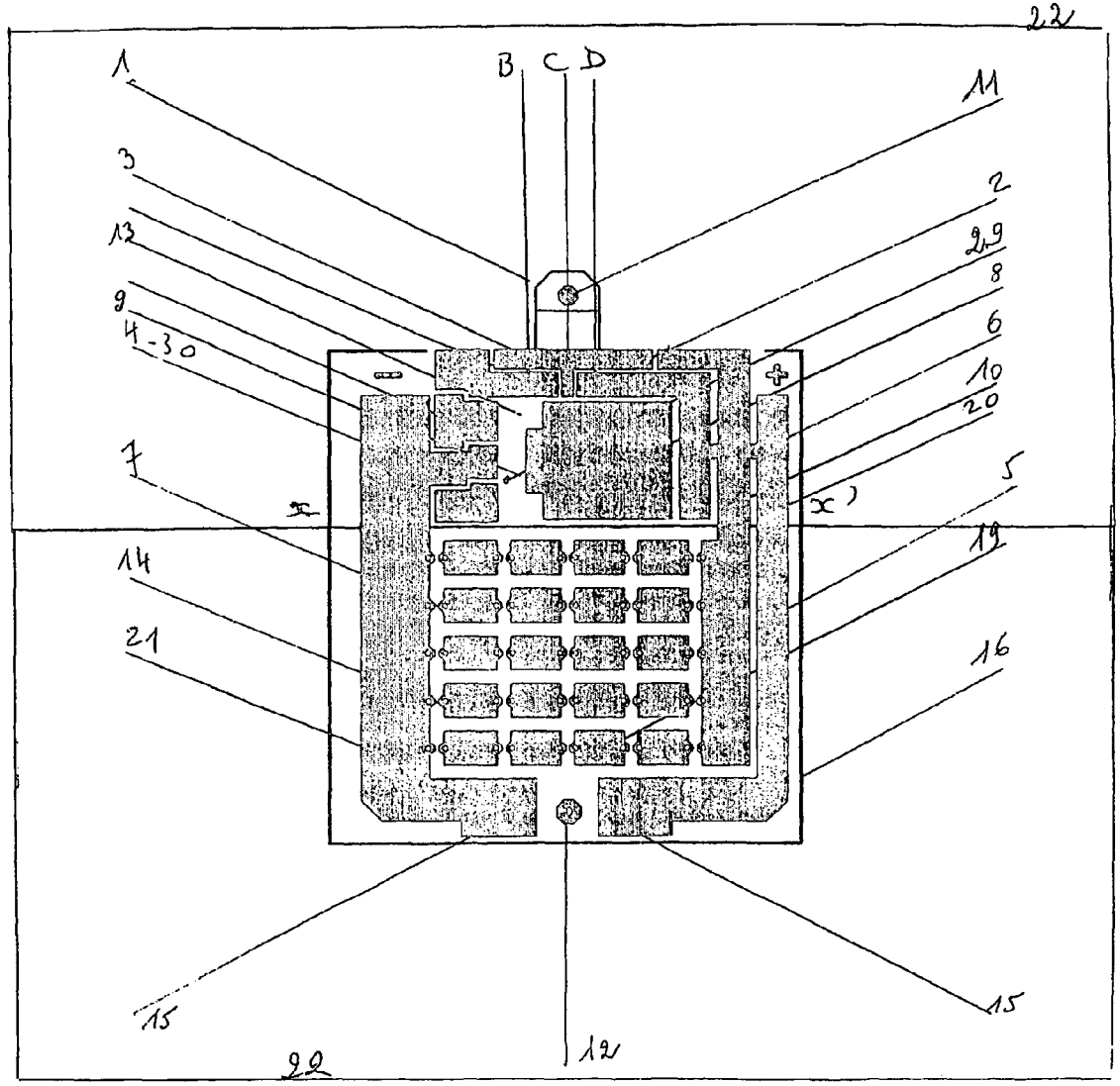
FIG. N°1

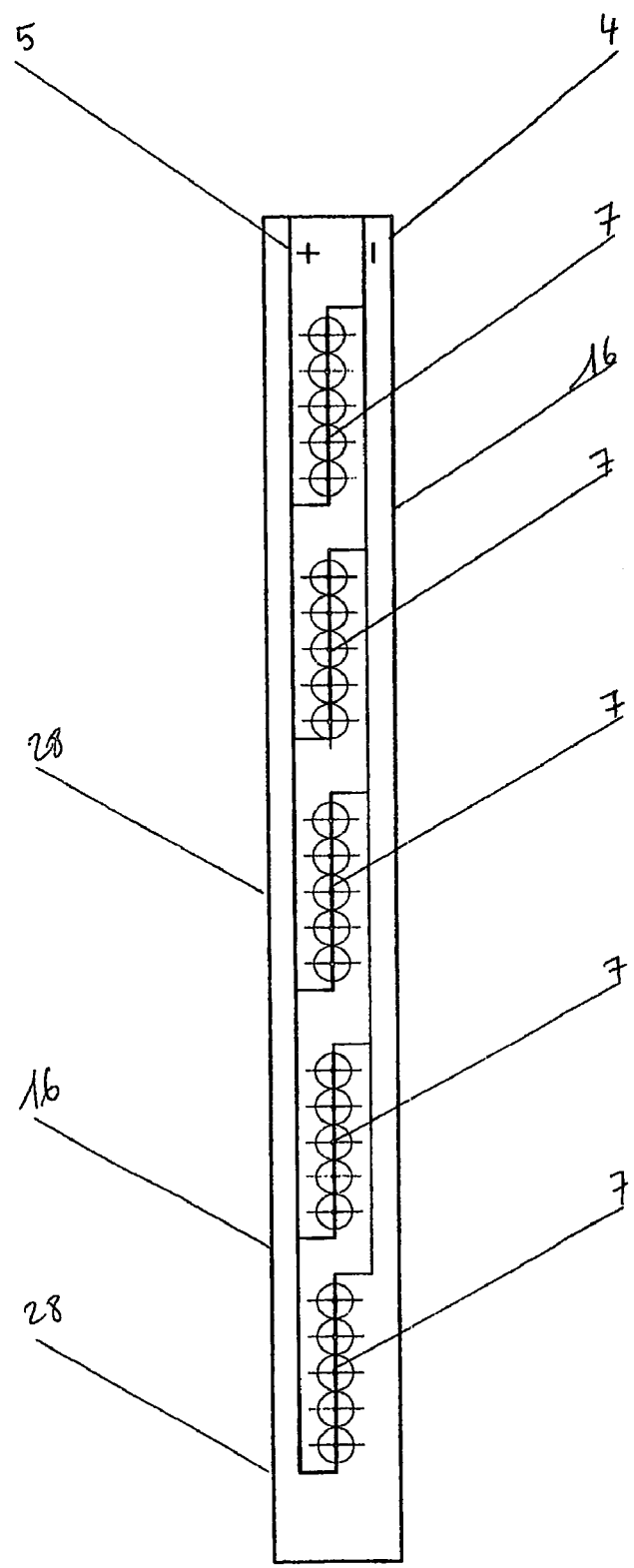
FIG. N°3

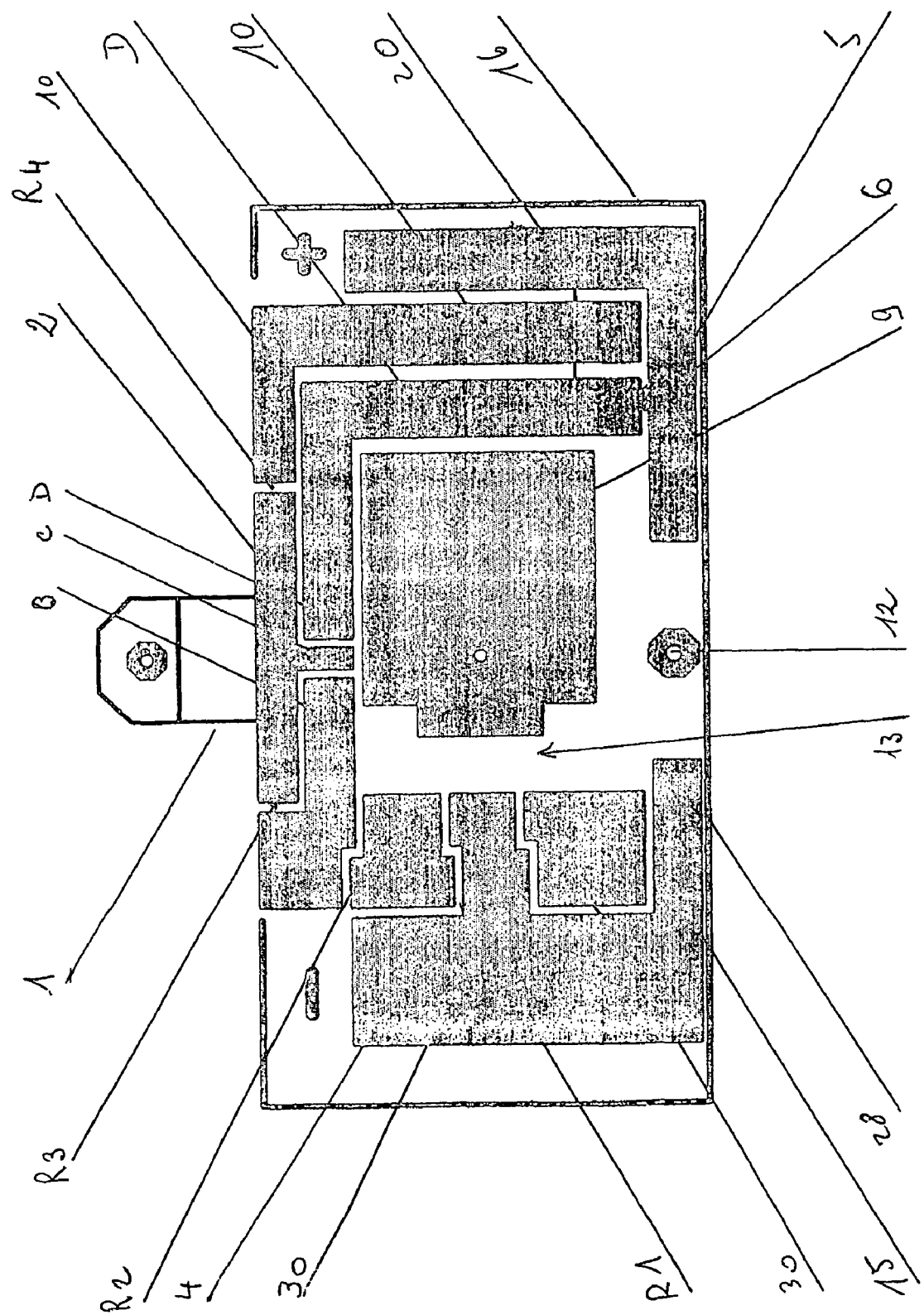
FIG N° 4

DEVICE FOR SETTING LUMINOSITY OF LIGHT-EMITTING DIODES

The present invention relates to LEDs, also called DEL, which means electro-luminescent device in English, a term as common as <<transistor>>.

The technical field according to the invention is that of electroptics, with its different systems of regulation or control, for the activation of its assemblies.

It is known that the technology since the 1960s, creation date of the semiconductors having luminous emission under voltage, is limited to using and exploiting these LEDs under a fixed voltage generally around 1.8 V integrated with constant current sources, with transistor, operational amplifier, integrated circuit, microcontroller, etc.

Although the LEDs are diodes, most of them are nevertheless fragile, notably from the fact of the substrate presenting very particular difficulties for constant compositions, supporting little inverse voltage . . . .

The assemblies up to present are occasional use assemblies that do not sufficiently feature this component, this basic electronic assembly. They limit their use, which remains fixed as for example with neon signs or scrolling, and whose fixed, continual brightness is regulated with a level considered low but optimum, therefore rigid and immutable.

The regulation device according to the invention aims to remedy this state of art, and is defined as the technical solution applied to a technical problem, and which is to provide a variable, non-linear character by means of a continuous regulation of the luminosity, regulation of the analog type, ultimately applied to this basic electronic component.

The invention includes a series assembly of several LEDs (7), and providing by using a voltage regulator (1), a potentiometer (8) and a particular resistive assembly, having the variable character of voltage compatible with the luminescence range of the LEDs.

The invention includes an assembly of several LEDs, specifically five LEDs in series, and multiples, assuring their functioning voltage using a LM 317 T adjustable voltage regulator, a 4.7 kilo ohms potentiometer, here of the P160BM type appropriate for and according to the invention, or other linear, and providing a continuous and linear variation of the source voltage of the circuit for the LEDs placed in series.

To refine the regulation of the luminescence, therefore of the necessary useful voltage, and also with the consumption, other elements will be installed, the other elements being of the purely resistive type and being an integral part of the invention, and that includes a particular assembly of resistances, here of the surface mounted component type, even, in certain cases, carbons, or adjustables, arranged in the following manner on the control gate of the regulator, for 1/ and 2/

1/ Resistance (R1) parallel with the potentiometer to extend, improve, its range of use on the totality of its 270° of rotation, having value, between 1 and 10 K, according to the invention approximately 2.4 kilo ohms, giving to the 4.7 K potentiometer, a new value of approximately 1.6 kilo ohms, placed in series on the gate 2/ Drop resistance (R2) or low resistance, for regulation, from 0.1 to 5 Kilo ohms at the beginning of luminescence, according to the invention, approximately 1.2 kilo ohms, the role of which is to assure a stable voltage, ranging between 7.5 and 8.5 volts, from the moment of placing the circuit under voltage, necessary at the beginning of luminance or powering up of the LEDs, placed in series on the gate, before the potentiometer. The low voltage value is adjusted by the resistance R2, to eliminate the ineffective range of the potentiometer.

3/ Drop resistance (R3) or high resistance, for regulation, for adjustment of output voltage (positive), to the LEDs circuit, having value 0.1 to 50 ohms, between 3 and 15 ohms according to the invention (if high power, then divisional R3s mounted in series) placed on the output of the regulator.

The value of the high voltage is adjusted by an integrated or composed resistance R3.

The 240 ohms resistance (R4) is specific to the workman for the mounting of the LM 317 T regulator. It is mandatory, not concerned with the invention.

The resistance defined in 1/, while extending the range of the potentiometer, must bring about a maximum output voltage for the application circuit having LEDs, between 12 to 12.5 V, potential difference between the negative base or ground, and the positive, to limit the output current.

This current which can vary from 150 to 850 milli ampere, and even more, according to the LEDs employed and their implemented quantity, with inherent risks of overheating, drift, thermal runaway, destruction of the LEDs and related elements such as support, coatings, must be limited by the control of the output voltage.

The resistance defined in 2/, or low resistance, acts at the beginning with the potentiometer, when the value of the potentiometer is at zero, to adjust the starting voltage, or start of the luminance regulation process, at approximately 7.5 to 8.5 V, LEDs extinguished. If this resistance is used to diminish and stop the luminosity at approximately 7.5 to 8.5 volts, and to eliminate non-useful lesser voltage, it determines therefore the starting point in the useful serviceable range of the slide on the 270 degrees of the carbon track of the potentiometer.

The resistance defined in 3/, or high resistance, acts at the end of the luminance regulation of the LEDs, fixed between 11 and 13 volts, according to the LEDs employed, and their quantities.

Although not being placed on the gate, the value of this resistance is included in the output voltage from the beginning to the end of the process of luminance regulation.

When the voltage is at its maximum on the LEDs circuit, between 11 and 13 volts, the resistance R3, independent of the two others, adjusts this maximum voltage.

Such resistances defined from 1/ to 4/ according to the invention, are surface mounted components, therefore mounted copper circuit side, such tracks plotted and demarcated on the circuit.

The device according to the invention is composed of a printed circuit (16) provided in its high part, along the axes x/x' and in its center with a LM317T whose back is joined, and in the same back plane (17) as the circuit. This regulator is soldered or mounted straddled or in bridge over the transverse track (2), to decrease the complication of tracks crossing with riders, and whose leads 2.3.4 are soldered at points B.C.D.

The transverse track front circuit view, comprises in its ends, at left 1 surface mounted component resistance of 240 ohms, at right 1 surface mounted component resistance of 1 to 150 ohms and, according specifically to the invention, 6.8 ohms.

The section B that receives the resistance of 240 ohms, receives a special resistance of 1.2 kilo ohms for fixed voltage regulation at beginning of luminiscence, the potentiometer being at zero or the minimum. On each side are arranged current paths via distinct traces that come from the low part.

In its low part, 5 series of LEDs in series of 5, with at least one series of 5 LEDs, or at least 5 LEDs in series, which proves the validity of the regulation of the invention and its applications. These LEDs or electroluminescent diodes, which are here arranged in series of 5, in parallel for the assembly, have in common the negative (4) of the circuit which acts directly with the potentiometer. On the right part, the input of positive (10) supplying the LEDs, outputs positive/negative in series, on 5 LEDs with central contact studs (19).

The input of positive voltage (5) is effectuated by a parallel trace, its high part terminated by a surface (20) where will be soldered a diode (6) 4007 for filtering and transfer of voltage straddled on the positive supply track (10) of the LEDs ensures the connection of the positive and transfers the input current of the regulation system of the circuit. (D)

The useful electric value of the LED diodes is established between 1.5 and 2.5 volts integrated. This latter value being a maximum, under continuous voltage, in order to not damage, even destroy, the silicon substrate by breakdown (fusion).

If V min=1.5 V, D 1 to n, limited to 5 D, where V D min=7.5 V

If V max=2.5 V, D 1 to n, limited to 5 D, where V D max=12.5 V

It is therefore a matter of placing these diodes D in series, by five, to obtain a system having broad range (approximately 5 volts), enabling regulation, passage from the extinguished state to the powered up state, clamped at approximately 12.5 volts, while acting on the gate and the output of the regulator.

The system enabling realization of such a range is composed of a potentiometer modified using a shunt or parallel resistance, in order to cause a drop in its value, and to make the increase of voltage of approximately 5 volts, voltage exerted on the gate, progressive on its entire range of 270 degrees, that is 1 volt for 55 degrees of rotation.

If the principal benefit of the very unique P160 BM includes on the one hand ultra thin gauge enabling its integration on a heat-sink plate and, on the other hand, in a thumb wheel blocked at the cap in a provided notch, ensuring a perfect concealment of the potentiometer, there is, however, a disadvantage because of its low availability in normalized E3 series, that is to say the values of 1, 2.2, 4.7 K and 10, 22, 47 Kilo ohms, which requires the placement of a resistance in parallel in order to obtain a precise value by composition, for a scale or range of regulation in direct relation with the envisioned utilization.

As a result, the high and low resistances come into regulation complement, to lead in all the cases of assembly, from the passage from the extinguished position, at start of range, that is between 7.5 and 8 volts, to the 12.5 volts powered up position, at end of range, useful voltages on circuit.

The input resistance is preceded in certain cases by a second input resistance, wedged between the potentiometer and principal input resistance, having a value between approximately 1 and 5 K in order to adjust the starting, or attack, voltage at the beginning of the range of the potentiometer, without compromising the maximum voltage delivered at the end of the range, on the aforementioned potentiometer, fundamental data for preserving this voltage limit, known as predetermined security limit, on the entire range, that is on 270 degrees.

The true adaptation according to the invention is that not only it requires to arrange 5 LEDs in series, 2.5 V×5=12.5 V plus the voltage drop of the LM317T from 1 to 2.5 V, According to the load, inputs a total of more than 13.5 Volts minimum, from where the necessity of utilization of a step-down transformer, self-inductive or with a decoupling, also called adapter, which ensures a minimal flow of 14 V DC with a minimum of 600 milliamperes in output current.

Taking into account the additional, voltage drops of the other components; namely 4007 protection diode, fuses (14), capacitors, and other assembly elements, more or less optional, suppression, resistive coefficient rectification, or security requirements, such as thermostat (21) having Microtherm blade, complementary security thermal fuse (22), with fusion cut circuit, it is necessary to at least use an adaptor, 12 VA from 15 volts.

For more security and power, a supply between 18 and 24 VA with output voltage output voltage equal to or greater than 18 volts will be chosen.

One will take care that the power dissipated in the LM 317 at its highest flow, difference between the input and output voltage multiplied by the current, does not damage the circuit, the heat sink, as well as the covering and riders, in addition to the minimal security rules to be observed, this by an expensive and excessive dissipation.

The LM317 T is preferably screwed on an aluminum heat sink (22).

The circuit is pierced in the area of the Radiohm 4.7 k potentiometer in the insulated zone (9) having a 16.5 mm hole, into which is introduced the aluminium cap of the potentiometer, in manner such that the cap traversing the epoxy of the circuit leaves a cylindrical shape having 3.5 mm height on a diameter of 16.5 at the exterior, without any other element able to interfere or to parasitize, and emerging from the non copper-plated face, ensuring its insulation is absolutely close-cropped, plane and thus lacking any object.

The rear plane or back of the LM317T, TO220, is in the same plane (17) as that the non copper-plated face of the printed circuit. The potentiometer is thus soldered inverted, by its three unfolded leads, spread out flat, each in a determined copper-plated sector.

The cap of the potentiometer penetrates into a hole provided for this purpose in the aluminum plate having 3 mm of thickness and 16.8 mm of diameter, so that the thickness of the potentiometer is completely concealed, integrated in the thickness of the potentiometer serving the purpose of heat sink and support. The potentiometer penetrates the aluminum plate of the heat sink on at least half the thickness of its cap.

The housing of the front-rear assembly is implemented on a self-supporting plate of the assembly. The aluminum plate can have a thickness less than 3 mm but then the cap of the potentiometer will extend past the difference; a small thumb wheel D22 or D24 is provided, from which the central tip of which will nest in a small plastic slit provided for this purpose, in the center of the cap. The potentiometer, because of its flat ultra cap, is thus integrated in the entire thickness of the heat sink plate, and emerges only from the circuit side, the three leads of connection, unfolded, flat with the circuit.

The thumb wheel, once positioned, will entirely cover and hide the potentiometer, and because of its small thickness, that is to say 2 mm, will ensure at the same time the conformance of the assembly and the ease of the regulation.

The circuit is pierced with a central hole at the low part at its end, (12) between the current input zones, places of soldering of a cord with 2 clamps (15)

The invention demonstrated that up to 800 series of 5 LEDs could be connected, without any failure for a consumption of 17 Amperes DC. The invention can be applied up to more than 100,000 series of LEDs without failure. Its applications are practically unlimited, but a limit appears with regard to the internal resistance of the regulator, and one will use in certain applications regulators of the Low Drop type.

The applications based on 5 LEDs series, negative cathodes, with regulator mounted according to the invention, relates to the automobile sector, with voltage step-up for the circuits with low source voltage, but also avionic, spatial, informatics, house automation, lighting, signaling, decoration, signs, etc.

The LEDs according to the invention are of the Kingbright L53 or L 7113 type, all colors, having low luminous intensity in order to not burn the retina during fixed observation, in particular red, varying from 2 to 80 millicandles, necessary to avoid the danger of burning, flicker, blooming, prickling and irritation of the eyes, with momentary or prolonged loss of sight, retinal pain, headaches.

The 3 LM317 T can be replaced, for small applications, by the basic model such as the LM 317 LP 100 Ma.

In high power applications, the better models are the LM 350 T, 350 k/LT 1038 CK, for the high efficiency supplies from 1.2 to 35 V from 500 Amperes and over.

The circuit can be separated at least in 2 along the x/x' axis or other finer schema, (28) to reduce the bulkiness and improve it.

The circuit can be in a long form (such as FIG. 3) as control panel lighting (2), strip lighting for signaling, object, advertising, etc.

The LEDs are always arranged in series of 5, but with at least a common output and input.

The circuit can comprise the LM on the exterior for different reasons. The latter will be connected to a rapid connection female jack having 3 female socket contacts having the pitch of 2.54, of the data-processing or other type, and it will be mounted on an attached heat sink.

In certain applications, the potentiometer can be non-linear but the bottom of its copper plated cap will be always soldered at 2 points on its rear on an insulated track (2) provided for this. Its third lead is soldered on neutral part (30), the central lead being common or negative, the first connected by resistances to the common negative zone from one side and from the other zone B place of connection of regulation of the variator with the 240 ohms foundry resistance.

The bridge assembly by soldering for the three leads of the LM 317 T (3) is an assembly joined in the plane of the printed circuit, which has a thickness ranging between 2 and $^{16}/_{10}$, specifically according to invention, here to $^{8}/_{10}$ mm.

On the track side there are thus the solderings of the LEDs, the surface mounted components, the leads of the LM317T, the leads of the overturned potentiometer, current inputs at the bottom, the 4007 diode for transfer and connection, plus possibly a thermal switch fuse.

On the non copper-plated side, there are the series LEDs defined above, the cap of the potentiometer and, in this plane, the plane of the LM317 T on the same plane and joined on the copper-plated side without any short circuit possible, of course. The aluminium plate (22) is a large rectangle whose grooved center allows the LEDs grouped in series to appear, for a particular luminous effect. The series can be of different colors.

The assembly with potentiometer and arrangement of resistances on the regulation voltage path of the gate (Adj.) of the LM317T regulator is thus entirely analog, resistive, and does not employ digital. It use neither controller, nor microcontroller, nor operational amplifier, and uses only a single regulator per range of regulatable voltage, and is here deliberately limited to be between 11 and 13 volts, that is respectively for high and low power LEDs. The invention relates to an entirely resistive system, the regulator being compatible to a thermal resistance controlled electrically by voltage, and not by current.

According to the quantity and quality of the LEDs utilized, the type, for example high power, strong radiation, the voltage drop in the regulator will be higher, with a weaker output voltage, but a strong current that will possibly be necessary to adjust by a more limited voltage, and applied on the gate.

According to the invention, the luminosity regulation circuit of the LEDs is realized owing to the fact that the LEDs are arranged in series of 5, supplied by a continuous voltage, using a LM 317 T voltage regulator (1), a 4.7 Kilo ohms potentiometer (8) provided with a parallel resistance (R1) for an efficient range between 7.5 and 12.5 volts on 270 degrees, and of two drop resistances, low (R2) and high (R3) delimiting the useful service or regulation voltage, or determined and calculated regulation plateau.

The regulation procedure is valid for all type of LEDs, including blues and whites, the limiting current of 1.5 A in the regulator being the same as that of the adapters, allows an assembly up to 185 LEDs per regulator.

Explanation Figures Number 1 to 4

1. figure of the circuit top or front view with its particular layout of tracks and its different technical points to validate the invention 2 cross-section figure of a bridge assembly of the LM317T with double foldings of the leads or electrodes, after 4 mm, enabling connection of them apart from the transverse track of contact 3 figure representing another type of assembly on a printed circuit rod or tab, with series of 5 serial LEDs, connected in parallel and respecting and laying out all the same polarity sets 4. figure representing the regulation assembly of the LEDs alone (28)

Drawings and Sketch References

| DESIGNATION | Numbering | Sketch |
| --- | --- | --- |
| Aluminum heat sink plate | 22 | 1 |
| 3 lead LM317 bridge assembly | 3 | 1-2-4 |
| Negative current supply tracks | 4 | 2-4 |
| Positive current supply tracks | 5 | 2-4 |
| 4007 rectifying diodes | 6 | 2-4 |
| Electolumincence LED diodes | 7 | 2-3-4 |
| 4.7 K potentiometer | 8 | 2-4 |
| insulated zone | 9 | 2-4 |
| led positive output current track | 10 | 2-4 |
| M3 hole of the LM 317 | 11 | 2-4 |
| Printed circuit M3 attachment hole | 12 | 2-4 |
| Printed circuit lead passage area | 13 | 2-4 |
| Fuse | 14 | 2 |
| Solder wire lands | 15 | 2-4 |
| Printed expoxy circuit | 16 | 2-4 |
| Microtherm thermostat | 20 | 2 |
| Traversal track | 2 | 1-2-4 |
| Zones b c d | 25 | 2-4 |
| Common plane | 17 | 1 |
| Other contact tracks | 26 | 2-4 |
| Double folding of the LM317 electrode pads | 27 | 1 |
| Short Circuit Safeguard | 9 | 2-4 |
| LM 317 T regulator | 1 | 1-2-3 |
| Central common negative pad | 30 | 30 |
| R1 | | 4 |
| R2 | | 4 |
| R3 | | 4 |
| R4 | | 4 |
| B | | 2-4 |
| C | | 2-4 |
| D | | 2-4 |

The invention claimed is:

1. A circuit comprising:
 a plurality of LED sets, each LED set having 5 LEDs coupled in series between themselves, the LED sets being coupled in parallel between themselves;
 a LM 317 adjustable voltage regulator having an output coupled to the LED sets, and having a gate;
 a potentiometer coupled to the LM 317;

a first resistance, configured as a drop resistance coupled in series on the gate, wherein the LED sets are supplied with a continuous voltage from the LM 317 adjustable voltage regulator.

2. A circuit according to claim 1 wherein the potentiometer has a value of 4.7 Kilo ohms and a rotation range of 270° and wherein the circuit further includes a second resistance, coupled in parallel with the potentiometer, to extend an effective range of the potentiometer to the totality of the rotation range, and ensure a voltage in the range of 12.0 to 12.5 volts applied to the LED sets.

3. A circuit according to claim 1 wherein the first resistance has a value in the range of 0.1 to 5 Kilo ohms so that, at the beginning of luminescence, the voltage applied to the LED sets is in the range of 7.5 to 8.5 volts, thereby eliminating any lower voltage and eliminating the ineffective range of the potentiometer.

4. A circuit according to claim 1 further including a third resistance, having a value in the range of 0.1 to 5 Kilo ohms, the third resistance being on the output of the regulator to regulate the output voltage to be in the range of 11 to 13 volts.

5. A circuit according to claim 1 further including a filtering diode to ensure the connection of the positive and the transfer of current input.

6. A circuit according to claim 1, characterized in that the regulator is bridge mounted over a transverse track.

7. A circuit according to claim 1 wherein the potentiometer includes a cap, and 3 leads including a central lead, and wherein the circuit further includes an insulated zone and a printed circuit in the insulated zone, the printed circuit having a center defining a hole, the cap of the potentiometer penetrating into the hole, the potentiometer being soldered upside down by the 3 leads unfolded in front, the central lead being coupled and soldered and to a common negative and a rear of the potentiometer being soldered by two points at the bottom of the cap, on an insulated track.

8. A circuit according to claim 1 wherein the potentiometer includes a cap, and the circuit further includes an aluminium heat sink plate, wherein the cap penetrates the plate to half or more of its height.

9. A circuit according to claim 1, characterized in that the circuit further includes a non-plated face defining a plane, and the regulator defines a rear plane joined to, and common with, the plane of the non-plated face.

10. A circuit according to claim 1, characterized in that the upper part can be independent of the LED sets to be supplied.

* * * * *